(12) United States Patent
Lefebvre et al.

(10) Patent No.: US 8,734,085 B2
(45) Date of Patent: May 27, 2014

(54) TURBINE SECTION ARCHITECTURE FOR GAS TURBINE ENGINE

(75) Inventors: Guy Lefebvre, Saint-Bruno de Montarville (CA); Eric Durocher, Vercheres (CA)

(73) Assignee: Pratt & Whitney Canada Corp., Longueuil (CA)

( * ) Notice: Subject to any disclaimer, the term of this patent is extended or adjusted under 35 U.S.C. 154(b) by 785 days.

(21) Appl. No.: 12/858,319

(22) Filed: Aug. 17, 2010

(65) Prior Publication Data

US 2011/0038706 A1 Feb. 17, 2011

Related U.S. Application Data

(60) Provisional application No. 61/234,435, filed on Aug. 17, 2009.

(51) Int. Cl.
  *F01D 25/14* (2006.01)
(52) U.S. Cl.
  USPC .............. 415/9; 415/149.4; 416/2; 416/198 R
(58) Field of Classification Search
  USPC ......... 415/9, 131, 149.2, 149.4, 173.4, 213.1, 415/174.4, 173.7, 174.2, 214.1, 215.1, 415/216.1; 416/2, 198 R
  See application file for complete search history.

(56) References Cited

U.S. PATENT DOCUMENTS

| | | | |
|---|---|---|---|
| RE30,600 E | 5/1981 | Long et al. | |
| 5,185,217 A | 2/1993 | Miyamoto et al. | |
| 5,433,584 A * | 7/1995 | Amin et al. | 415/229 |
| 6,009,701 A | 1/2000 | Freeman et al. | |
| 6,073,439 A | 6/2000 | Beaven et al. | |
| 6,082,959 A | 7/2000 | Van Duyn | |
| 6,109,022 A | 8/2000 | Allen et al. | |
| 6,382,905 B1 | 5/2002 | Czachor et al. | |
| 6,494,032 B2 | 12/2002 | Udall et al. | |
| 6,652,222 B1 | 11/2003 | Wojtyczka et al. | |
| 6,783,319 B2 | 8/2004 | Doerflein et al. | |
| 6,827,548 B2 | 12/2004 | Coxhead et al. | |
| 7,011,490 B2 | 3/2006 | Albrecht et al. | |
| 7,229,247 B2 | 6/2007 | Durocher et al. | |
| 7,229,249 B2 | 6/2007 | Durocher et al. | |
| 7,266,941 B2 | 9/2007 | Eleftheriou et al. | |
| 7,318,685 B2 | 1/2008 | Bouchy et al. | |
| 7,565,796 B2 | 7/2009 | Eleftheriou et al. | |
| 8,087,874 B2 * | 1/2012 | Jardine et al. | 415/9 |
| 2004/0037694 A1 * | 2/2004 | Mather | 415/9 |
| 2004/0055276 A1 * | 3/2004 | John Lewis et al. | 60/226.1 |
| 2006/0093466 A1 * | 5/2006 | Seda et al. | 415/68 |
| 2006/0093468 A1 * | 5/2006 | Orlando et al. | 415/68 |
| 2008/0022692 A1 * | 1/2008 | Nagendra et al. | 60/796 |
| 2008/0178603 A1 * | 7/2008 | Mons | 60/779 |

* cited by examiner

*Primary Examiner* — Nathaniel Wiehe
*Assistant Examiner* — Aaron Jagoda
(74) *Attorney, Agent, or Firm* — Norton Rose Fulbright Canada LLP

(57) ABSTRACT

A turbine section of a gas turbine engine is described, which includes an aftmost rotor extending, an aftmost stator located upstream of the aftmost rotor, and a second to last aftmost rotor located upstream of the aftmost stator. The second to last aftmost rotor being spaced apart a first axial distance from the aftmost stator. A turbine exhaust case is located downstream of the aftmost rotor and includes an inner radial wall and an outer radial wall defining a main gas path duct downstream of the aftmost rotor. The turbine exhaust case being axially spaced apart from the aftmost rotor a second axial distance that is greater than the first axial distance.

14 Claims, 4 Drawing Sheets

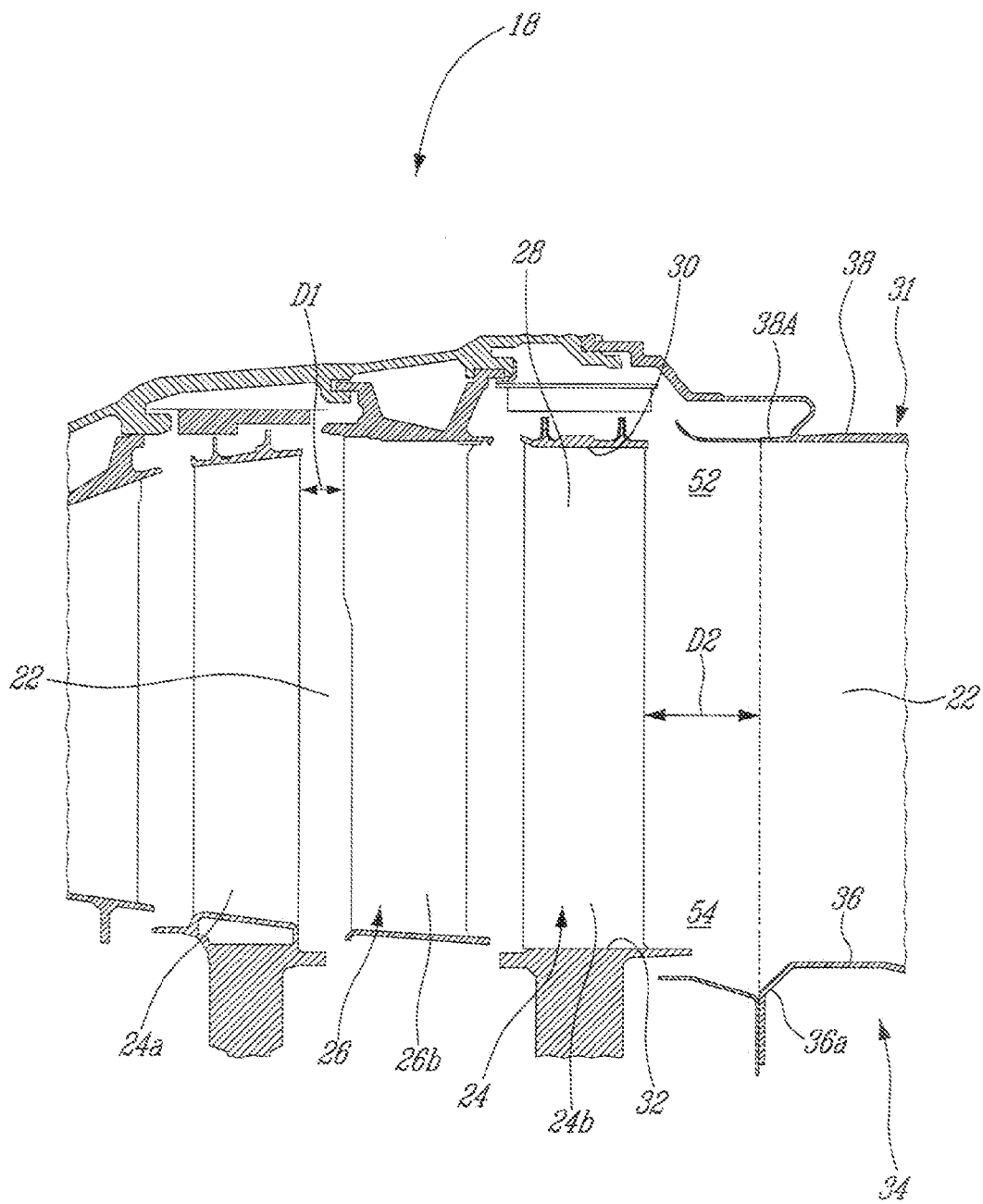

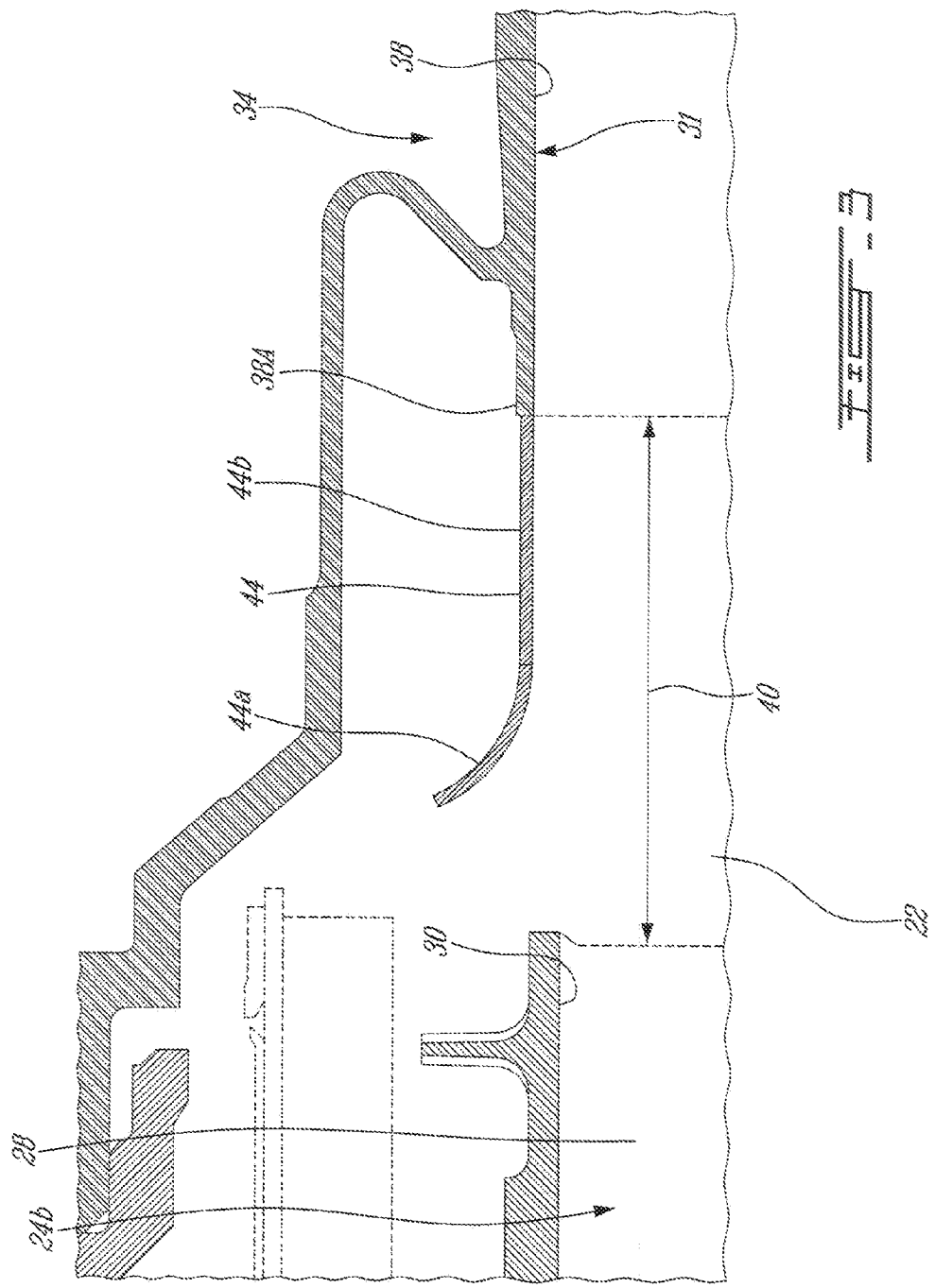

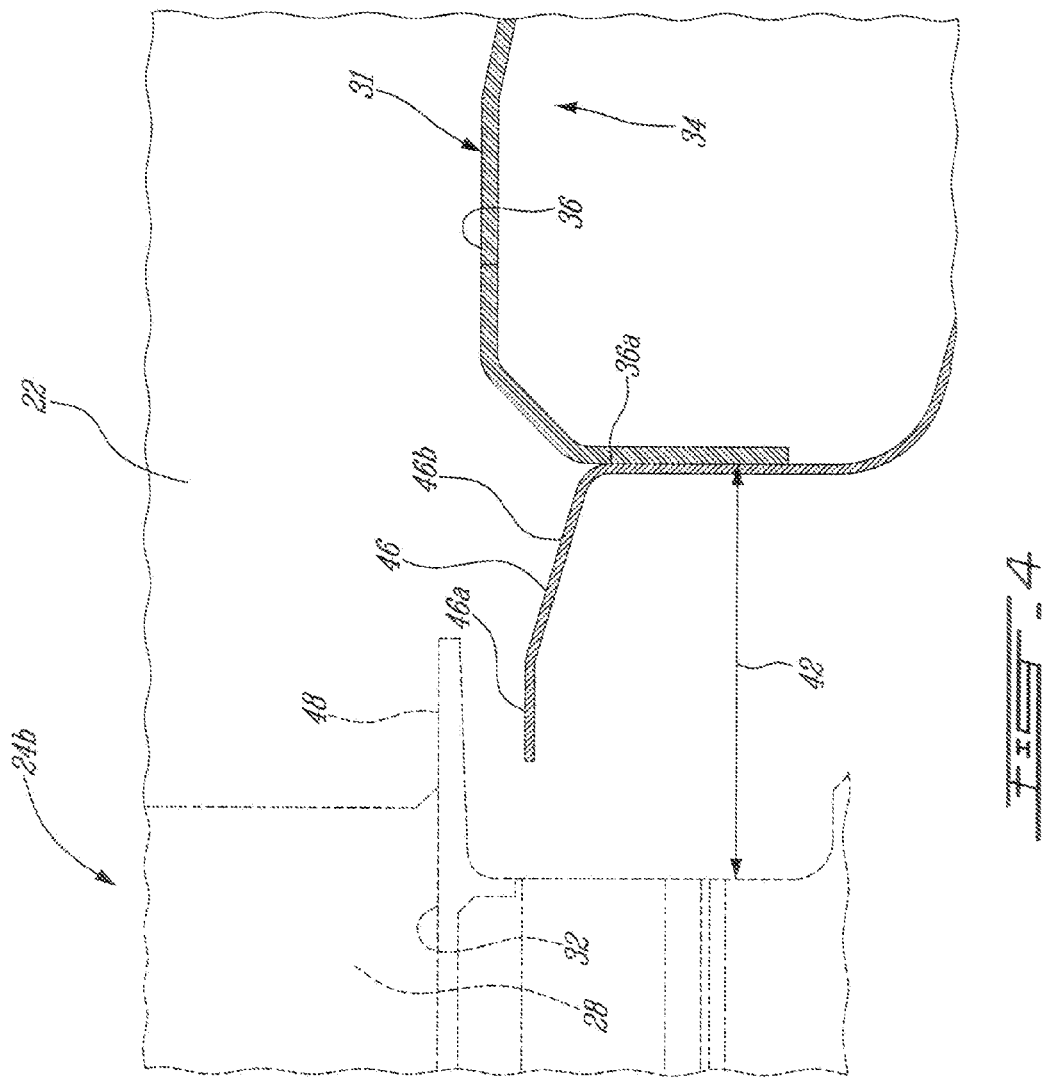

US 8,734,085 B2

TURBINE SECTION ARCHITECTURE FOR GAS TURBINE ENGINE

CROSS-REFERENCE TO RELATED APPLICATION

This application claims priority on U.S. provisional application Ser. No. 61/234,435, filed Aug. 17, 2009, which is incorporated herein by reference.

TECHNICAL FIELD

The application relates generally to gas turbine engines and, more particularly, to a turbine section architecture.

BACKGROUND OF THE ART

In the unlikely event of a main shaft shear in a gas turbine engine, significant structural damage may be caused by the rotors attached to the shaft. As such, it is important that the kinetic energy of the rotor blades be reduced prior to any impact thereof on components which are important to the structural integrity of the engine. Prior art gas turbine engines have been known to comprise fuel shutoff mechanisms in order to slow or stop the rotation of the engine if shaft shear occurs. However, the inclusion of a fuel shutoff mechanism increases the weight and cost of the engine.

Therefore, there remains a need for an improved turbine section which can cope with engine shaft shear events.

SUMMARY

In one aspect, there is provided a turbine section of a gas turbine engine defining a main gas path extending therethrough, the turbine section comprising: an aftmost rotor extending radially through the main gas path; an aftmost stator extending radially through the main gas path and located upstream of the aftmost rotor; a second to last aftmost rotor extending radially through the main gas path and located upstream of the aftmost stator, the second to last aftmost rotor being spaced apart a first axial distance from the aftmost stator; and a turbine exhaust case located downstream of the aftmost rotor, the turbine exhaust case including an inner radial wall and an outer radial wall defining a main gas path duct downstream of the aftmost rotor, the main gas path duct defining a portion of the main gas path, the turbine exhaust case being axially spaced apart from the aftmost rotor a second axial distance, the second axial distance being greater than the first axial distance.

In another aspect, there is provided a gas turbine engine comprising: a compressor section, a combustor downstream of the compressor section, a turbine section downstream of the combustor and including a plurality of rotors and a plurality of stators alternately disposed along a main gas path of the gas turbine engine, the plurality of rotors including an aftmost rotor; and a turbine exhaust case disposed downstream of the turbine section, the turbine exhaust case including: an annular outer radial wall located downstream of an aftmost turbine rotor of the turbine section; an annular inner radial wall located downstream of the aftmost turbine rotor of the turbine section, the outer and inner radial walls defining a main gas path duct downstream of the aftmost turbine rotor, the main gas path duct defining therebetween a portion of the main gas path; an outer deformable member extending in an upstream direction from an upstream end of the outer radial wall, the outer deformable member at least partially sealing an axial gap between the outer radial wall of the turbine exhaust case and the aftmost turbine rotor; and an inner deformable member extending in an upstream direction from an upstream end of the inner radial wall, the outer deformable member at least partially sealing an axial gap between the inner radial wall of the turbine exhaust case and the aftmost turbine rotor.

DESCRIPTION OF THE DRAWINGS

Reference is now made to the accompanying figures in which:

FIG. 2 is a cross-sectional view of a portion of a turbine section in accordance with one embodiment of the present disclosure;

FIG. 3 is an enlarged cross-sectional view of an outer radial portion of the turbine section of FIG. 2; and FIG. 4 is an enlarged cross-sectional view of an inner radial portion of the turbine section of FIG. 2.

DETAILED DESCRIPTION

Figure 1:
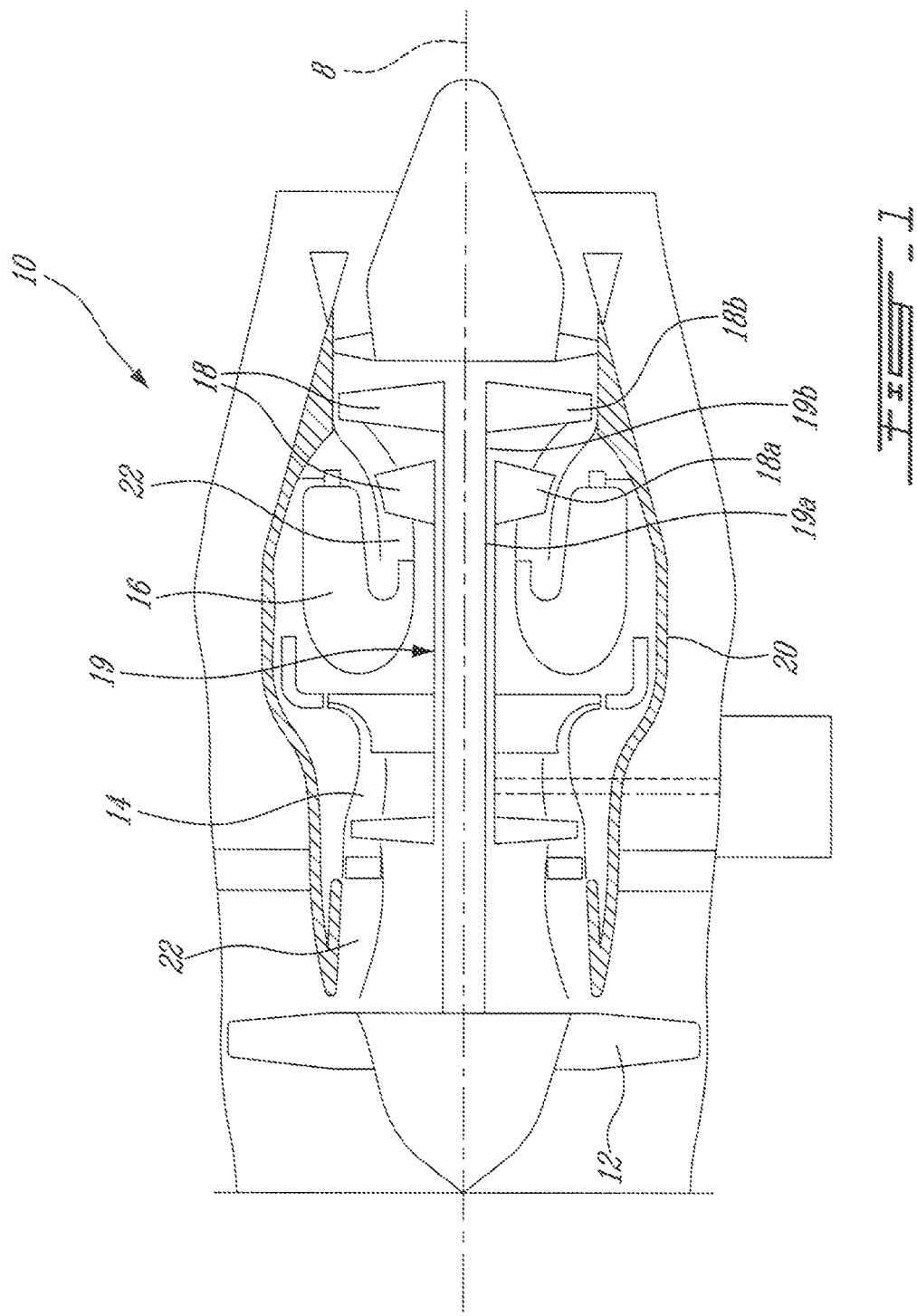
FIG. 1 is a schematic cross-sectional view of a turbofan engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 further includes at least one rotatable engine shaft 19 which interconnects the compressor section 14 and the turbine section 18. In one embodiment, the gas turbine engine 10 includes two shafts, a low pressure shaft 19b connected to the fan 12 and a low pressure turbine 18b, and a high pressure shaft 19a connected to the high pressure compressor 14 and a high pressure turbine 18a. The engine shafts 19 are concentric and coaxial with a longitudinal axis 8 of the engine 10.

The gas turbine engine 10 includes a casing 20 which encloses the turbo machinery of the engine. A portion of the air propelled by the fan 12 flows through a main gas path 22 which is defined within the first casing 20 and allows the flow to circulate through the multistage compressor 14, the combustor 16 and the turbine section 18 as described above.

The turbine section 18 may include a high pressure turbine 18a and a low pressure turbine 18b. In other embodiments, the turbine section 18 may additionally include other sections thereof, for example an intermediate pressure turbine section.

Referring to FIG. 2, the low pressure turbine 18b of the turbine section 18 includes at least one rotor 24 and stator 26, however may additionally include a plurality thereof. In FIG. 2, an aftmost rotor 24b is shown at a downstream end of the turbine section 18, with an aftmost stator 26b being located just upstream of the aftmost rotor 24b, and a second to last rotor 24a being located upstream of the aftmost stator 26b. The second to last rotor 24a is located an axial distance D1 (i.e. a distance in a direction substantially parallel to the engine axis 8) from the aftmost stator 26b. D1 therefore represents the smallest distance separating the second to last rotor 24a from the aftmost stator 26b.

As seen in FIG. 2, a turbine exhaust case 34 is located downstream of the aftmost rotor 24b of the turbine section and fastened to the upstream turbine casing surrounding the turbine section 18. More particularly, the turbine exhaust case (TEC) 34 is located an axial distance D2 from the aftmost rotor 24b. In one embodiment, D2 represents the smallest distance separating the aftmost rotor 24b from the turbine exhaust case 34. The distance D2 is greater than the distance D1, and therefore the second to last rotor 24a is in closer proximity to the aftmost stator 26b, than the aftmost rotor 24b is in proximity to the turbine exhaust case 34.

When a shaft, for example the low pressure shaft 19b of the engine 10, shears, bends or becomes otherwise damaged, the rotors of the compression section 16 and the turbine section 18 may become misaligned with respect to the longitudinal axis 8 or may be displaced axially and/or radially and as such, can potentially impact the engine main case 20 or the turbine exhaust case 34, causing significant structural damage, such that the structural integrity of the engine 10 may be catastrophically affected.

By providing a distance D2 between the aftmost rotor 24b and the turbine exhaust case 34 which is larger than the distance D1 between the second to last rotor 24a and the aftmost stator 26b, in the event that the shaft 19b shears and the rotors fixed to this broken shaft are axially displaced away form the engine core, the second to last rotor 24a will impact the aftmost stator 26b prior to the aftmost rotor 26b impacting the turbine exhaust case 34. As such, when the second to last rotor 24a impacts the aftmost stator 26b, the kinetic energy of the rotors 24 is absorbed or dissipated and so, any damage caused to the turbine exhaust case 34 or to the engine casing 20 is reduced.

Referring still to FIG. 2, the aftmost rotor 24b includes an airfoil portion 28 having an outer radial end 30 which is located in proximity to an outermost radial end 52 of the main gas path 22, and an inner radial end 32 which is located substantially in proximity to an innermost end 54 of the main gas path 22 through the turbine section 18.

The turbine exhaust case (TEC) 34 includes an annular inner radial wall 36 and an annular outer radial wall 38, the annular walls 36, 38 defining an annular main gas path duct 31 therebetween which extends downstream of the rotors 24, the main gas path 22 being defined inside the main gas path duct 31 downstream of the rotors 24. The inner radial and outer radial walls 36, 38 of the TEC 34 are located slightly downstream of the aftmost rotor 24b.

As seen in FIG. 3, a first axial gap 40 is formed between the upstream end 38a of the outer radial wall 38 of the turbine exhaust case 34 and the outer radial end 30 (the blade tip, for example) of the aftmost rotor 24b. As seen in FIG. 4, a second axial gap 42 is formed between the upstream end 36a of the inner radial wall 36 of the turbine exhaust case 34 and the inner radial end 32 (the turbine disk, for example) of the aftmost rotor 24b. The axial length of the first gap 40 is therefore the distance between the outer radial wall 38 and the aftmost rotor 24b and the axial length of the second gap 42 is therefore the distance between the inner radial wall 36 and the aftmost rotor 24b.

In one particular embodiment, the first and second axial gaps 40, 42 may have the same axial length, however, the first and second axial gaps 40, 42 may also differ. The size of the axial gaps 40, 42 between the aftmost rotor 24b and the turbine exhaust case 34 are selected to be sufficiently large such that the second to last rotor 24a will impact the aftmost stator 26b rather than the TEC 34 in the event of a turbine shaft shears. This may mean, for example, that the axial distance between the aftmost rotor 24b and the aftmost stator 26b is smaller than the axial gaps 40,42. However, as a result, the axial space between the aftmost rotor 24a and the inner and outer walls 36,38 of the downstream TEC 34 may be so large that an unwanted amount of gas flow would be lost therebetween. In order to avoid this unwanted loss of main gas flow between the aftmost turbine 24b and the TEC 34, outer and inner deformable duct members 44,46 are provided between aftmost turbine 24b and the TEC 34 such as to reduce the effective axial distance therebetween and therefore to reduce the length of the gaps 40,42.

In the embodiment seen in FIG. 3, an annular outer radial deformable duct member 44 is connected to the outer radial wall 38 and extends axially therefrom towards the aftmost rotor 24b. The deformable duct member 44 extends at least partially across the first gap 40 and acts as an inner wall of the main gas path 22 along at least a portion of the length of the first gap 40. Similarly, as seen in FIG. 4, an annular inner radial deformable duct member 46 is connected to the inner radial wall 36 of the turbine exhaust case 34 and extends axially therefrom towards the aftmost rotor 24b. The deformable duct member 46 extends across at least a portion of the second gap 42 and acts as an inner wall of the main gas path 22 along at least a portion of the length of the second gap 42. As such, the lengths of the first and second gaps 40, 42 are effectively reduced by the deformable duct members 44, 46 which respectively extend thereacross.

These outer radial and inner radial deformable duct members 44, 46 are configured to be structurally weaker in the axial direction than in the radial direction, such that they are easily bendable, deformable and/or frangible axially when a minimum amount of axial load is imposed thereon. The deformable duct members 44, 46 may, for example, be provided with a specific shape, such as a conical shape, a flared shaped or having a bellmouth at the upstream ends thereof. Alternately, the deformable duct members may be provided with a portion therefore that is weaker than a remainder thereof, for example having a deformable portion having a thinner wall thickness, a pre-weakened region, or a portion made of a weaker material.

The outer radial deformable duct member 44 as shown in FIG. 3, for example, includes an upstream portion 44a which is curved radially outward, and a downstream portion 44b connected at one end thereof to the upstream portion 44a and connected at an opposite end thereof to the turbine exhaust case 34, the downstream portion 44b being substantially axial. The outer radial deformable duct member 44 serves as an extension of the main gas path duct 31, such that the main gas path duct 31 is lengthened and a portion of the first gap 40 is sealed. The extension of the main gas path duct 31 formed by the deformable member 44 maintains the aerodynamics of the flow channelled through the turbine section 18 into the turbine exhaust case 34, and thus reduces any turbulence caused to the flow due to the first gap 40. In addition, the upstream portion 44a of the outer radial deformable duct member 44, because of its radially outwardly curved shape, aids in channelling the fluid flow passing through the aftmost rotor 24b into the main gas path duct 31, while nevertheless being deformable should the rotor 24b become free and move aftwards. The deformation of the deformable duct member 44 in at least an axial direction will thereby absorb at least some of the kinetic energy of a freely spinning turbine rotor, and thus help reduce the effects of the released rotors in the event of a shaft shear.

As seen in FIG. 4, the inner radial deformable duct member 46 includes an upstream portion 46a which is substantially axial, and a downstream portion 46b connected at one end thereof to the upstream portion 46a and connected at an opposite end thereof to the turbine exhaust case 34, the downstream portion 46b extending both axially and radially. Similarly to the outer radial deformable duct member 44, the inner radial deformable duct member 46 serves as an extension of the main gas path duct 31, such that the main gas path duct 31 is lengthened and a portion of the second gap 42 is sealed. The inner radial deformable duct member 46 may axially overlap an aft portion 48 of the inner radial end 32 (ex: the blade root) of the aftmost rotor 24b. As such, the overlap of the aft portion 48 by the deformable duct member 46 reduces any flow which may be ingested radially inward from the main gas path 22 inside the turbine section 18. In one embodiment, the upstream portion 46a is generally parallel to the aft portion 48 of the inner radial end 32 of the rotor blades, such that the aft portion 48 and the upstream portion 46a are spaced apart radially.

Note that, in another embodiment, the outer radial deformable duct member 44 may serve as an overlap with the aftmost rotor 24b, and the inner radial deformable duct member 46 need not overlap the aftmost rotor 24b. Other such alternate embodiments of the deformable duct members 44, 46 fall within the scope of the present disclosure. Note that although the deformable duct members 44, 46 are described as being annular because they extend about the full circumference of the TEC 34, in another embodiment, the deformable duct members 44, 46 may comprise a series of non-continuous deformable duct member 44, 46 which are circumferentially disposed on the annular inner radial and outer radial walls 36, 38, respectively, about the longitudinal axis 8 of the engine 10.

The outer radial and inner radial duct members 44, 46 are at least axially deformable, and therefore are non-structural in that if they were to break or deform, the structural integrity and functioning of the gas turbine engine 10 as a whole would not be affected. The deformable duct member therefore has a structural rigidity less than that of the turbine exhaust case, as it will more easily bend and/or break when a load is applied thereon such as to thereby absorb the impact energy in the place of the turbine exhaust case. The term "deformable" as used herein is intended to include breaking (i.e. it is frangible), bending or otherwise changing shape, crumpling, etc. As such, the duct members 44, 46 are designed so as to be bendable or breakable when even a relatively small amount of axial load is applied thereto. In different embodiments, each duct member 44, 46 may collapse on itself, may bend, may crack, and/or may become compressed and disintegrate, such that minimal loads are transmitted to the turbine exhaust case 34 when the duct members 44, 46 are impacted.

The above description is meant to be exemplary only, and one skilled in the art will recognize that changes may be made to the embodiments described without departing from the scope of the invention disclosed. For example, the invention may be used in other portions of the turbine section or alternatively, may be applied to a compressor section. Still other modifications which fall within the scope of the present invention will be apparent to those skilled in the art, in light of a review of this disclosure, and such modifications are intended to fall within the appended claims.

The invention claimed is:

1. A turbine section of a gas turbine engine defining a main gas path extending therethrough, the turbine section comprising:
    an aftmost rotor extending radially through the main gas path;
    an aftmost stator extending radially through the main gas path and located upstream of the aftmost rotor;
    a second to last aftmost rotor extending radially through the main gas path and located upstream of the aftmost stator, the second to last aftmost rotor being spaced apart a first axial distance from the aftmost stator;
    a turbine exhaust case located downstream of the aftmost rotor, the turbine exhaust case including an inner radial wall and an outer radial wall defining a main gas path duct downstream of the aftmost rotor, the main gas path duct defining a portion of the main gas path, the turbine exhaust case being axially spaced apart from the aftmost rotor a second axial distance, the second axial distance being greater than the first axial distance; and
    at least one deformable duct member extending from at least the outer radial wall of the turbine exhaust case, the deformable duct member projecting in an upstream direction towards the aftmost rotor over at least a portion of an axial gap therebetween, the deformable duct member being structurally weaker in an axial direction than in a radial direction, and being substantially frangible when a predetermined maximum axial load is applied thereto, the predetermined maximum axial load being insufficient to deform the turbine exhaust case, such that the deformable duct member is able to absorb an impact force of the aftmost rotor.

2. The turbine section as defined in claim 1, wherein a third axial distance between the aftmost rotor and the aftmost stator is smaller than the second axial distance.

3. The turbine section as defined in claim 1, wherein the deformable duct member at least partially axially overlaps an axially extending aftmost portion of the aftmost rotor.

4. The turbine section as defined in claim 3, wherein the axially extending aftmost portion of the aftmost rotor is a rearwardly extending blade root at a radially inner end of the aftmost rotor.

5. The turbine section as defined in claim 1, wherein the deformable duct member includes at least one of an inner deformable duct member extending from the upstream end of the inner radial wall of the turbine exhaust case and an outer deformable duct member extending from the upstream end of the outer radial wall of the turbine exhaust case.

6. The turbine section as defined in claim 1, wherein the deformable duct member extends substantially axially from the turbine exhaust case.

7. A gas turbine engine comprising:
    a compressor section, a combustor downstream of the compressor section, a turbine section downstream of the combustor and including a plurality of rotors and a plurality of stators alternately disposed along a main gas path of the gas turbine engine, the plurality of rotors including an aftmost rotor; and
    a turbine exhaust case disposed downstream of the turbine section, the turbine exhaust case including:
        an annular outer radial wall located downstream of an aftmost turbine rotor of the turbine section, an annular inner radial wall located downstream of the aftmost turbine rotor of the turbine section, the outer and inner radial walls defining a main gas path duct downstream of the aftmost turbine rotor, the main gas path duct defining therebetween a portion of the main gas path;
        an outer deformable member extending in an upstream direction from an upstream end of the outer radial wall, the outer deformable member at least partially sealing a first axial gap between the outer radial wall of the turbine exhaust case and the aftmost turbine rotor;
        an inner deformable member extending in an upstream direction from an upstream end of the inner radial wall, the inner deformable member at least partially sealing a second axial gap between the inner radial wall of the turbine exhaust case and the aftmost turbine rotor; and
        wherein the outer deformable member and the inner deformable member being structurally weaker in an axial direction than in a radial direction, and the outer and inner deformable members being substantially frangible when a predetermined maximum axial load is applied thereto, the predetermined maximum axial load being insufficient to deform the outer and inner radial walls from which the outer and inner deformable members project, such that the outer and inner deformable members are able to absorb an impact force of the aftmost turbine rotor.

8. The gas turbine engine as defined in claim 7, wherein an aftmost stator is located upstream of the aftmost rotor and a second to last aftmost rotor is located upstream of the aftmost stator, the second to last aftmost rotor being spaced apart a first axial distance from the aftmost stator, and at least one of the outer radial wall and the inner radial wall being spaced apart from the aftmost rotor a second axial distance, the second axial distance being greater than the first axial distance.

9. The gas turbine engine as defined in claim 8, wherein a third axial distance between the aftmost rotor and the aftmost stator is smaller than the second axial distance.

10. The gas turbine engine as defined in claim 7, wherein at least one of the inner deformable members and the outer deformable members axially overlaps a portion of an axially extending aftmost portion of the aftmost rotor.

11. The gas turbine engine as defined in claim 10, wherein the axially extending aftmost portion of the aftmost rotor is a reawardly extending blade root at a radially inner end of the aftmost rotor.

12. The gas turbine engine as defined in claim 7, wherein an aftmost stator is located upstream of the almost rotor and a second to last aftmost rotor is located upstream of the aftmost stator and is spaced apart and separated therefrom by an axial distance, and wherein the axial distance is smaller than both an axial length of the first axial gap and an axial length of the second axial gap.

13. The gas turbine engine as defined in claim 7, wherein at least one of the inner and outer deformable members has a radially extending portion.

14. The gas turbine engine as defined in claim 13, wherein the outer deformable member has the radially extending portion at an upstream end thereof, and the inner deformable portion has the radially extending portion at a downstream end therefore proximate the inner radial wall of the turbine exhaust case.

* * * * *